United States Patent [19]
Farber

[11] 3,902,252
[45] Sept. 2, 1975

[54] MAGNETIC FIELD DIRECTIONAL SENSOR

[75] Inventor: Fredric Farber, Putnam Valley, N.Y.

[73] Assignee: Safe Flight Instrument Corporation, White Plains, N.Y.

[22] Filed: Jan. 2, 1974

[21] Appl. No.: 429,969

[52] U.S. Cl. .................................. 33/361; 33/356
[51] Int. Cl.² ...................................... G01C 17/30
[58] Field of Search ............ 33/356, 361, 362, 355, 33/366

[56] References Cited
UNITED STATES PATENTS

| | | | |
|---|---|---|---|
| 3,445,761 | 5/1969 | Loughead | 33/355 X |
| 3,634,946 | 1/1972 | Star | 33/356 |

*Primary Examiner*—William D. Martin, Jr.
*Attorney, Agent, or Firm*—Edward A. Sokolski

[57] ABSTRACT

An improved magnetic direction sensing arrangement adapted to provide digital output indicating carrier direction is provided in an embodiment comprising a mechanism for periodically scanning the earth's magnetic field ("geoflux") with a flux concentrating device directing flux through a "Hall effect" sensing element which, in turn, generates an electrical output representing a geoflux heading (signal proportional in magnitude and polarity to the magnetic flux received); with circuit means for processing this output signal in conjunction with a generated "carrier alignment" signal, combining these to arrive at a "carrier heading" signal, representing carrier direction in relation to this terrestrial magnetic field — preferably doing so by detecting a Magnetic West heading with zero-crossing detector means to generate a "westward" pulse once each concentrator-revolution; together with means for generating the "carrier alignment" pulse once each revolution, along with a photo-detector "timing disc" arrangement adapted to detect the rotational (phase) difference between these two pulses, digitally, and thus produce a digital output signal processed to represent "carrier heading".

7 Claims, 9 Drawing Figures

MAGNETIC FIELD DIRECTIONAL SENSOR

INTRODUCTION

Workers in the art are familiar with magnetic directional sensing arrangements. Such digital compass systems provide a digital heading output by continuously and repetitively scanning the earth's magnetic field with a field sensing device. Such devices customarily produce a first signal representing carrier alignment (typically, the lubber line of a vessel) and then generate a second signal when aligned in a reference orientation to the earth's magnetic field (e.g. a Magnetic North indication), this being referenced to carrier alignment during each sensing scan cycle. Spatially-related pulses occurring between the two signals (angular difference in terms of sensor rotation) are counted to provide a digital output representing the magnetic carrier heading. One prior art arrangement for indicating such a heading is taught in U.S. Pat. No. 3,634,946, where a field sensitive pick-up is rotated.

The present invention relates to a like arrangement for periodically establishing the direction of this terrestrial magnetic field as related to carrier alignment, wherein the direction of the field relative to the carrier (vehicle) disposition therein may be indicated conveniently by a digital output. Such geoflux may be considered as emanating between the earth's magnetic poles with the total magnetic vector (intensity and direction) varying at different locations; for instance, depending upon the distance from a pole, as well as distance above the earth's surface of the detector. This geoflux is, of course, known to be directed parallel to the earth's surface only in equatorial regions, whereas north and south of the equator it exhibits a varying "dip" (or vertical inclination angle with respect to the earth's surface). Devices according to the present invention can advantageously employ known means for measuring such geoflux and, when properly operated, better respond to the total magnetic field vector wherever sensed.

In accordance with the present invention, an improved magnetic direction sensing system is provided wherein flux concentrating means are scanned rotatably through the geoflux to maximize detected flux and present it efficiently to an operatively associated flux sensor, preferably a Hall Effect device adapted to responsively generate a flux-monitoring output. This output will periodically vary as a function of the geoflux strength sensed, during each rotation of this concentrator with a prescribed constant, reference phase of this signal — preferably the positive-negative zero crossing (corresponding to concentrator orientation in the Westward direction) — being flagged to thus produce a periodic indication of geoflux orientation (e.g. sensing where Magnetic North is, once every second). Now, once during each such flux-scan, reference is also taken of the alignment of the carrier, or instrument platform (e.g. a moving vessel). This alignment direction may be sensed once each scan cycle (e.g. to give the lubber line of a vessel) and compared with the geoflux heading, with a difference-determination being generated with each scan. Thus, with the angular rotational difference between geoflux and carrier alignment so determined — and digitally it may be presented as a digital indication of magnetic carrier heading.

Conventional devices in this field suffer from certain disadvantages, such as the requirement that the flux sensing device be rotated or otherwise translated, along with associated disadvantages in extracting the output therefrom (e.g. using electrical slip rings to extract information from a rotating Hall Effect sensor, with the attendant signal noise and unreliability and with varying modes of contact between rings, the problem of supplying power to the Hall device — the wear of the slip rings, etc.) as well known in the art. Likewise, many such devices require that all flux concentrating means be rotated.

However, in accordance with the present invention, an improved magnetic compass arrangement is provided which avoids such difficulties and disadvantages, and which exhibits such salient improvement features as a stationary omnidirectional magnetic flux concentrator, a stationary (Hall Effect) sensor; a rotating magnetic flux concentrator operatively associated with the sensor, etc., with no need for rotating all the concentrators or the sensor, nor for the associated electrical slip rings and associated disadvantages. Also provided are related electrical signal processing means whereby the digital heading-output may be produced simply by counting the number of prescribed regular angularly-oriented pulses from a prescribed reference means (rotating synchronous with the flux concentrator) between the occurrence of the magnetic field pulse and the reference pulse and processing this to be read-out as the carrier heading.

In a preferred embodiment, an improved digital compass is provided which presents a digital output representing magnetic heading as determined by counting pulses in a rotating angular reference counter scanned synchronous with the flux concentrator. As with conventional systems, the heading represented by this output may be selectively modified (converted) to compensate for any known correction factor, such as the magnetic variation, deviation or the difference between magnetic and geographic poles. Another feature of advantage is that this heading information originates in digital form and accordingly takes advantage of the precision, the ease of processing and the clarity characteristic of such digital information.

Thus, it is an object of the invention to meet at least some of the foregoing problems and disadvantages and to provide at least some of the foregoing features and advantages. A more particular object is to provide this in an improved magnetic field directional sensor arrangement. A further object is to provide this in a system employing a rotating flux concentrator in operative association with a stationary sensing element, such as a Hall Effect crystal. A further object is to provide this in additional association with a stationary flux concentrator, operatively coupled to the sensor. Yet another object is to provide such a device eliminating the need for rotating the flux sensor means and/or the flux concentrator means and the associated electrical slip rings and the disadvantages associated with such. Other objects and advantages will become more apparent upon the consideration of the following detailed disclosure of a preferred embodiment teaching how to make and use the same and providing a more complete understanding of the invention in conjunction with the attached drawings wherein:

GENERAL PLAN

Figure 3:
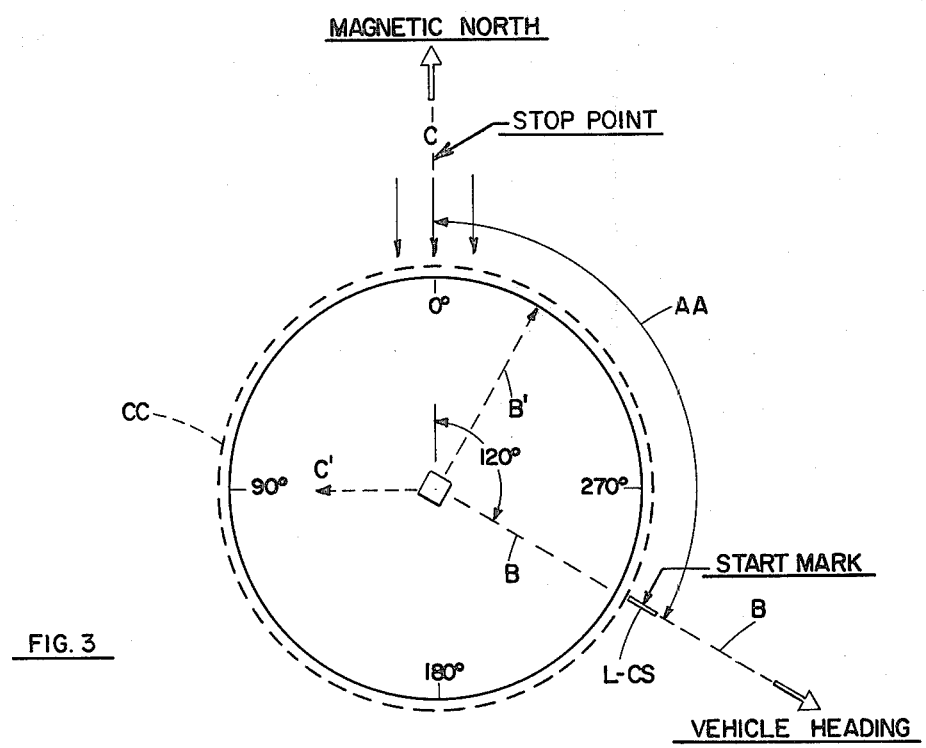
FIG. 3 is a very schematic pictorial representation of a exemplary geoflux-carrier orientation, to illustrate how to produce a digital magnetic heading indication, such as with the embodiments of FIGS. 1 and 2 in accordance with the invention.

Turning now to FIG. 3, the general concept of the invention may be best introduced by considering an illustrative example of how a digital magnetic heading signal is typically generated according to the subject invention. Here, a reference compass circle cc is drawn (dotted line) with the major points of the compass (headings) indicated as: 0° (or Magnetic North); 90° (or Magnetic West, assuming a counter-clockwise progression, and detector-sweep here); 180° (or Magnetic South); and 270° (or Magnetic East). It should be understood that, basically, only two points of the compass need be detected and referenced, according to this scheme, namely: Magnetic North and vehicle heading. (This latter to be employed as a reference axis, which, of course, will vary with each shift in vehicle direction.) In the present example of FIG. 1, vehicle heading is indicated along axis B, as at the "240° heading" (or somewhat close to Magnetic Southeast). It will be remembered that the principal object is to detect these two directions and to digitally sense the angular difference between them — this difference (angular deviation from 0°) is schematically indicated by arc AA, drawn between axis B and 0°, in the counter-clockwise direction. (Of course, if a clockwise direction were used for sensing, the 360° complement will be involved.)

Thus, the operation of this instrument may be stated simply: the vehicle heading (axis B) is detected as a starting point (start pulse *sp*) whereupon an angle detect means is initiated to sweep out the deviation until stopped at Magnetic North, putting out a signal representing this deviation. Thus, the detection of Magnetic North is employed to (generate a stop pulse *so* and) terminate angle detection. Angle detection is preferably implemented by rotating a properly coded reference means, such as a coded timing disc, synchronous with the sweep of the field sensor. Such a timing disc may, preferably, put out incremental angle-sweep pulses to read-out means which is started and stopped upon detection of vehicle heading and Magnetic North, respectively. Thus, somewhat in the fashion of a digital clock, this output may be presented (properly translated) as a digital magnetic heading (deviation from North).

Digital determination of this deviation from Magnetic North involves sweeping a magnetic flux sensor periodically about the compass to produce the mentioned pair of reference (start/stop) pulses once during each sweep: a start pulse *sp* when the sensor is aligned with (some reference axis along) the carrier heading (the vehicle or other carrier bearing the instrument, etc; this heading being a selected reference direction, such as the longitudinal axis, or lubber line of a vessel); and a stop pulse *so* when aligned with a reference point of the geoflux defining the earth's magnetic field.

If a timing disc or the like is rotated synchronously with this sensor so that equi-sectorial markings may be detected as a digital measure of the total sector so swept (corresponding to the arc sector between the two reference directions), these pulses may readily be counted and presented as a digital output representing magnetic heading. Of course, the spacing between such markings may be arbitrarily selected so that the pulses represent some convenient rotational increment, such as one pulse per compass degree.

Thus, by way of example, suitable means (particularized below) will be provided to determine the desired deviation sector, sweeping it out with a coded timing disc or like angle-counter, this counting being initiated at the carrier heading point, being read-out as a summed chain of incremental heading pulses P-A, the sum being terminated at Magnetic North reference heading (e.g. by zero crossing means, etc., as described below).

As a feature in the embodiment, the flux sensor is rotationally advanced by a +90° sector for convenience of detection, it being preferred to employ zero crossing detection means with the geoflux output for various reasons of convenience — thus settling upon the 270° (or Magnetic West) geoflux phase, as further discussed below. However, as workers will readily appreciate, this (or any) sectorial correction-advancement may readily be rereferenced to the Magnetic North point (e.g. by making a 90° correction in final output). The foregoing will become more apparent upon consideration of the following description (especially re FIG. 5-D).

Of course, a different flux detection mode (and associated reference heading) may be employed, with corresponding adjustment in generation and/or conversion of the digital deviation output. For instance, if the sensor means were aligned and adjusted to detect the 270° (Magnetic East) heading, for convenience; whereupon the raw deviation read-out signal would have to be suitably complemented (either with a +90° or a −270°, depending upon direction of sensor rotation). Of course, for a conventional "True" numerical compass heading, one should take the complement of values given in FIG. 3 (as would be characteristic of clockwise rotation also).

INSTRUMENT

Figure 1:
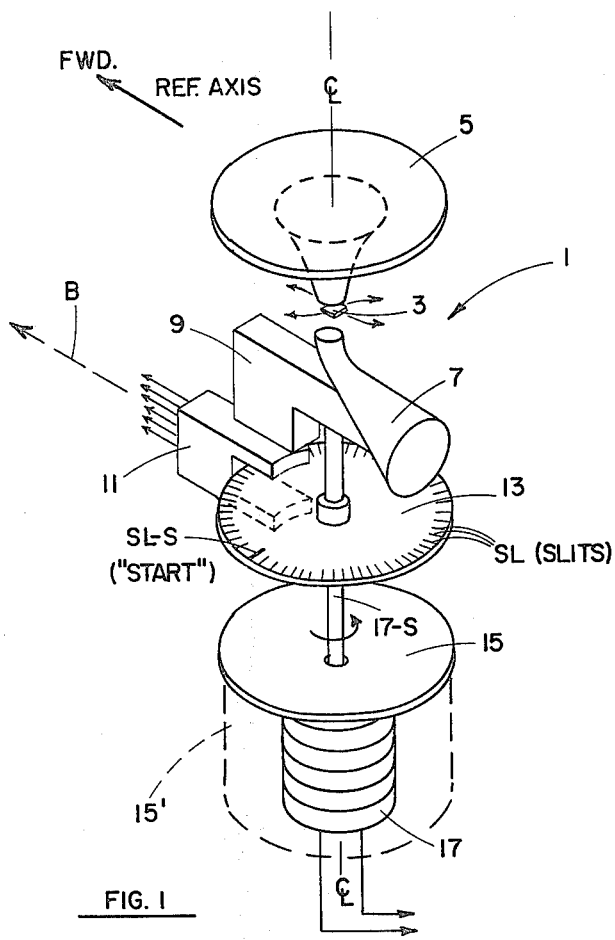
FIG. 1 is a schematic isometric illustration of the mechanical elements of a preferred embodiment; with FIG. 6, a similar isometric view, showing the same with some elements repositioned and a few structural packaging details added.
Figure 6:
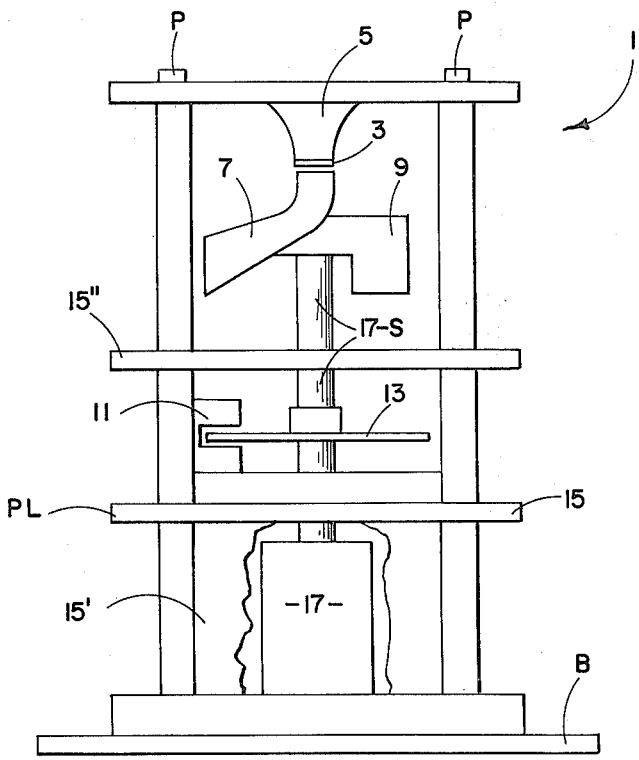

Turning now to FIGS. 1 and 6, there is shown a magnetic direction finder 1 as a preferred embodiment hereof. Instrument 1 basically comprises a suitable magnetic flux detector 3 (preferably a Hall Effect crystal) in operative relation between a pair of magnetic concentrators, one fixed (5) and one rotating (7). Concentrator 7 is rotated in a prescribed manner and in synchronism with a prescribed rotation clocking means (here, a photo-electrically encoded timing disc 13 with associated angle-increment markings and an associated photo-electric detection array 11 to indicate passage of the markings). Suitable rotation means, such as motor 17 and drive shaft 17-s on which rotating concentrator 7 and timing disc are mounted is also provided. A magnetic shield 15 is provided to isolate the detector from the influence (flux) of the motor. Stationary magnetic concentrator 5 is provided at the upper side of the detector 3 opposite concentrator 7. Any suitable speed of drive shaft rotation may be (selectably) conventionally provided (for instance, with intermediate gear and associated shift means) to rotate the concentrator and timing means at appropriate velocities (e.g. fast enough to update the heading information at reasonably frequent intervals). A visual indicator or display and associated control panel may readily be provided. Suitable digital display means, such as mechanical counters, nixie tubes and like are well understood in the art (though none shown here).

More particularly, instrument 1 will be understood as suitably housed in an instrument housing (not shown in FIG. 1, but well understood in the art and functionally represented in FIG. 6 by base pedestal B and mounting pillars P) being intended to be suitably gimbaled for free universal movement with respect to its carrier (e.g. relative to a platform on which it is mounted) so as to maintain a prescribed, constant attitude relative to plumb (and, in turn, to the geoflux). It is, of course, preferable to level the instrument and thereby maintain plumb orientation, since familiar reliable mechanical means are available for this, although it will be recognized that another reference orientation may be selected (and the latter may be practical for such applications as a zero gravity space vehicle).

Instrument 1 is preferably positioned in prescribed constant relation to a reference axis (e.g. the lubber line of a vessel carrier) and is located and shielded so as to experience minimum interference and magnetic disturbance (such as from extraneous electrical fields). For instance, it may be positioned on the masthead of a sailing vessel. When used in a moving vehicle, the detector will preferably be so gimbaled and also be stabilized in a fixed attitude relative to plumb (with latitude and longitude geoflux-direction corrections being made as is conventional — e.g. for dip and for longitude-deviations).

The magnetic-flux-detecting Hall Effect crystal 3 is, of course, held stationary, according to a feature hereof. As well known in the art, it comprises an electrical semiconductor device which, when subjected to a prescribed magnetic flux transverse to the direction of electric current therethrough, experiences a potential difference (P.D) generated between opposite sides of the crystal, this P.D. being detected as a voltage across the crystal, as is very well known in the art. Above a minimum flux density, this crystal will generate an output voltage representative of the geoflux conducted thereto through the concentrator. Crystal 3 is, of course, held stationary and in flux-communicating relation with stationary flux concentrator 5 (preferably being cemented or otherwise affixed to the narrow output end of 5) and in intimate efficient flux-communication with the narrow output end of rotating concentrator 7. An air gap, on the order of 10 mils (0.01 inches), has been found effective.

Flux concentrators 5, 7 are, of course, intended to gather in a maximum geoflux and thus maximize the flux density input to crystal 3. This will, in turn, maximize the rate of flux change sensed (e.g. preferably by the zero-crossing detector means — the slope of flux density change being maximized at the zero crossing null to provide optimum response and optimum signal output and noise ratio, especially in the vicinity of the zero crossing). Thus, it will be assumed that the concentrators are shaped, as indicated in FIGS. 1 and 6, to be relatively cross-sectionally convergent upon crystal 3 and of a relatively low-reluctance material (to define, generally, a flux path of minimum length, maximum cross section and relatively high permeability, $\mu$)

Concentrators 5, 7 are thus preferably comprised of a soft ferromagnetic material, such as soft iron or Permalloy. Such material will be of low enough reluctance (magnetic force per unit flux) and high enough permeability (ratio of flux density to magnetized intensity of material) to be very suitable; yet being magnetically soft will exhibit low coercivity and residual magnetism — characteristics similar to those of good transformer core or motor.

Concentrators 5, 7 are shaped to present their narrowed-flux-confronting faces relatively flat and parallel to the face of crystal 3 and are preferably oriented to point in a favorable direction relative to gathering in a maximum geoflux, as known in the art. Rotating concentrator 7 is preferably bent, relatively smoothly, at 90° so that its outer, flux-gather face may be turned in a direction relatively normal to plumb, while the outer enlarged face of stationary concentrator 5 is disposed normal to plumb (though this may be varied).

According to a preferred feature, rotating concentrator 7 is counterbalanced with a nonmagnetic counterweight 9, mounted relatively opposite concentrator 7 on rotating shaft 17-s and adapted to provide a substantially equalizing moment about the shaft and to thus facilitate stable rotation about this fixed axis without wobble or the like, as will be understood in the art. Counterweight 9 may be comprised of any nonmagnetic material as known in the art. For instance, it has been found that with the indicated crystal and flux concentrators (each having a crosssectional diameter going from the order of one-fourth inch to the order of several inches) and rotating concentrator 7 at about 120 r.p.m., with the rotational shaft aligned somewhat along plumb, that a relatively balanced sinusoidal output of the type indicated in FIGS. 5-A through 5-D is readily produced — this geoflux output having an amplitude on the order of 0.2 volts and zero-crossing slope of the type illustrated, with a START mark signal level of about 0.5 VDC. Rotational speed of the concentrator should be as relatively high as possible, although the speed will not change the information delivered except to update it more frequently and to sharpen somewhat the zero-crossing slope. Preferably, rotation will be at 120 r.p.m. or more to update read-out each half second or less. Workers in the art will perceive that within the spirit of this idea, these geoflux sensing means may be modified.

Instrumental 1 also includes a suitable stationary magnetic shield 15 (preferably as part of a cylindrical container 15' about motor 17) adapted to intercept magnetic flux emanating from motor 17 to substantially prevent it from interfering with the geoflux detection described, as workers will readily understand. Preferably, this shield will completely enclose the motor to assure that substantially all flux therefrom is captured and prevented from affecting field measurements (encapsulation indicated by dotted line 15', not shown in detail, but well known in the art).

Also, attached to shaft 17-s to be rotated synchronously with concentrator 7 is a coded timing disc 13 including angularly spaced indicia (markings) adapted to be detected by detector assembly 11 to produce the mentioned start pulses *sp* and associated sectorial and timing signals indicative of angular degrees swept out between start and stop. Disc 13 is comprised of non-magnetic material and is relatively opaque (optically; at least about its circumferential periphery) with 360 equi-spaced slits (markings) entirely about the circumference, thus forming 360 transparent degree slits SL, together with a transparent START slit SL-S. The disc is otherwise opaque so that passage of each transparent slit may be detected by assembly 11 to thus monitor the rotational progress of shaft 17-s and concentrator 7 thereon, rotating in prescribed synchronism therewith so that each slit SL denotes a prescribed angular distance. Detector assembly 11 comprises a lamp-photocell arrangement of a well known type, mounted at a fixed position on the instrument housing and comprising a pair of photocells adapted to detect the passage of the degree slits SL and START slit SL-s, respectively (see respective photocells 11-*cc*, 11-*cs* in FIG. 2 — described below). These photocells are aligned along the mentioned reference carrier heading, axis B (or their output is so electronically referenced thereto, as known in the art), so as to emit a signal when a respective (degree or START) slit passes by (crosses axis B). In FIG. 3, detection of the passage of Start mark SL-S will occur when disc 13 sweeps SL-S past associated light beam position L-CS, understood as representing the locus of the beam directed to register with photocell 11-CS, through START slit SL-S, this position L-CS being selectively adapted to be aligned along the vehicle heading reference axis B — in this case, at about 240° or east by south; note also that corresponding sweep arc AA thus here sweeps out 120° to North.

Preferably the exciter lamp comprises light-emitting diode means (LED) as known in the art — one for each photocell with the illumination therefrom collimated and aligned (through aperture means) to illuminate the reference slit areas on disc 13, being aligned with the position of the photocells on the opposite side of the disc. Thus, a photocell output will be generated upon passage of a transparent slit under this light beam. As workers in the art will recognize, other equivalent means may be used, such as an ordinary incandescent lamp exciter and associated photo-detector means. The signal output may be generated by interruption of the light beam through a transparent disc with opaque markings, not transparent slits, thereon, to be detected by transmission or reflection, as known in the art. Base B and concentrator 5 are fixedly joined by pillars P, with shield 15 and platform 15' also mounted thereon, to thus provide a stationary mount on which the mentioned elements are positioned. Motor 17 may be affixed on base B and the photo-detect array 11 mounted at shield 15.

CIRCUIT

Figure 2:
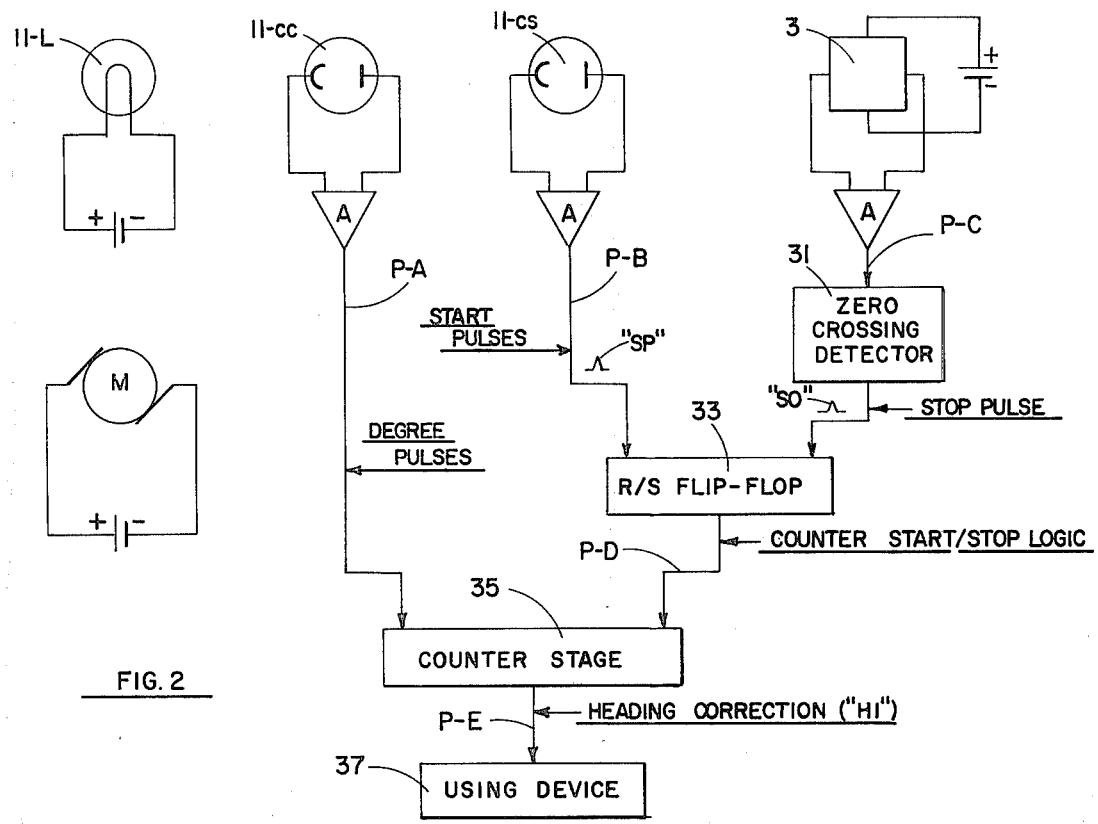
FIG. 2 is an electrical schematic block diagram of a system for processing the output signals from an embodiment like that in FIG. 1 in accordance with the invention.

FIG. 2 shows a very schematic functional, system block diagram of the detection means, including the aforementioned exciter lamp 11-L and associated photocells 11-*cc*, 11-*cs*, as well as the Hall Effect crystal 3 and its associated power supply. It will be understood that as the concentrator 7 rotates its angular progress will be tracked and digitally monitored by the timer means — that is, that timing disc 13, in conjunction with the associated exciter lamp 11-L and photocell 11-*cc* will generate a prescribed number of degree pulses P-A (here, 360 pulses per revolution is selected for convenience) and present these to the counting stage 35; and that the reference photocell 11-*cs* will similarly be made to generate a Start pulse SP once per revolution in synchronism with the output from companion photocell 11-*cc* (both outputs may be suitably shaped as well as amplified by associated stages A) and fed through appropriate circuitry to set a conventional Flip-Flop 33 (these pulses being suitably shaped or delayed by conventional means such as a multivibrator stage, as required and as known in the art) — setting Flip-Flop 33 to a logical one state, thereby enabling counter stage 35 to accept and count all succeeding degree pulses P-A (e.g. gating them into a Register) from photocell 11-*cc* until 33 is Reset (e.g. Flop 33 may function as a one-shot multivibrator if necessary to shape and prolong the signal on 35). Counter stage 35 may comprise an IN-gated series of decade counters as known in the art.

The output from sensor crystal 3 (see P-C, FIGS. 5) is amplified and shaped through a suitable amplifier stage A (e.g. suitable band-pass to minimize external, periodic and transient magnetic and electronic disturbances) and this output presented to zero-crossing detector stage 31. Stage 31 responsively produces a STOP pulse output so when, and only when, signal P-C passes through the North/South zero point (or positive/negative null). STOP pulse so is fed to reset Flip-Flop 33 to its off state, terminating its enabling input P-D to counter stage 35 and thus disabling the counter, preventing the counting of any additional degree pulses P-A from photocell 11-*cc*. This may also act to gate-out the summed count pulse P-E to using stage 37. Counter stage 35 thus stops counting and remains at its total count until set again by Flop 33 (responsive to START pulse sp). Similarly, means known in the art (not shown) are provided to clear the counter and enable it to begin a new counting cycle.

Counter stage 35 will have its output connected to utilization stage 37, which may comprise any conventional known digital indicating means, in combination with associated means such as conventional memory and decoding means (e.g. where a BCD or like timer code is used). Memory means may also be optionally provided, as known in the art; for instance, to store this digital output for a selectable period so as to freeze a detected heading output.

CIRCUIT FUNCTION

Thus, it will be understood that the electrical output from crystal 3 is processed to form a continuous, cyclic flux output signal P-C, as indicated in FIGS. 5-A through 5-D. Stop pulse *so* is applied to one (disabling) input of a bistable pulse generator unit (Flip-Flop) 33 to switch it to OFF and, in turn, disable the output from counter 35. The reference pick-off output from photocell 11-*cs* is supplied, through an appropriate amplifying stage A, as a start pulse *sp* to initiate the operation of Flip-Flop 33 and, in turn, provide an output P-D therefrom adapted to enable the operation of counter stage 35 (until 33 is disabled by stop pulse *so* and so disables 35).

Similarly, the degree-counting output from photocell 11-*cc* is applied, through amplifying stage A, as a chain of degree counting pulses P-A to counter stage 35, each pulse P-A being registered and accumulated by counter stage 35, this stage 35 being disabled (as indicated); whereupon counter stage 35 may, in turn, produce an output signal P-E, a digital signal representing, digitally, the number of angular degrees swept between START and STOP and applying this to a utilization device 37 (such as a digital display or the like, as well known in the art). Heading information signals H-I may also be provided to modify this digital output P-E — e.g., to correct for the positioning of concentrator 7, to correct for the true magnetic heading (longitude deviation) and the like, as known in the art.

OUTPUT

Figure 4:
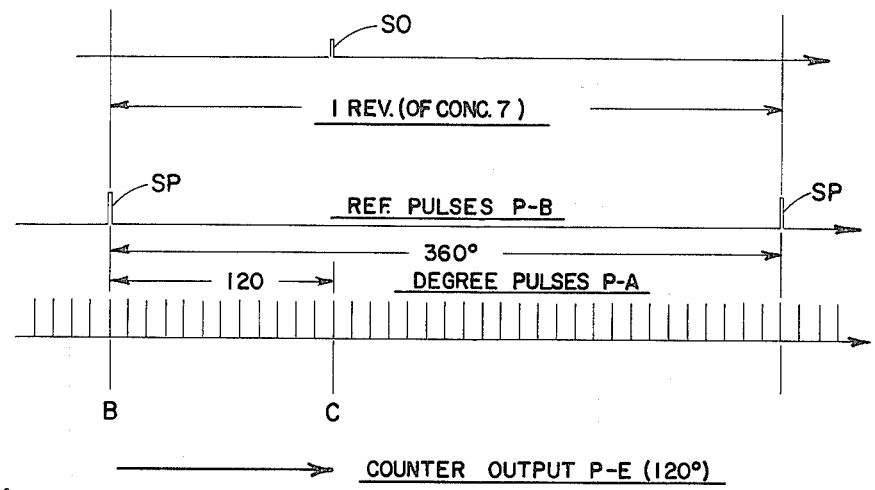
FIG. 4 represents a timing diagram correlating illustrative pulses from these embodiments as produced in the manner indicated in FIG. 3.
Figure 5A:
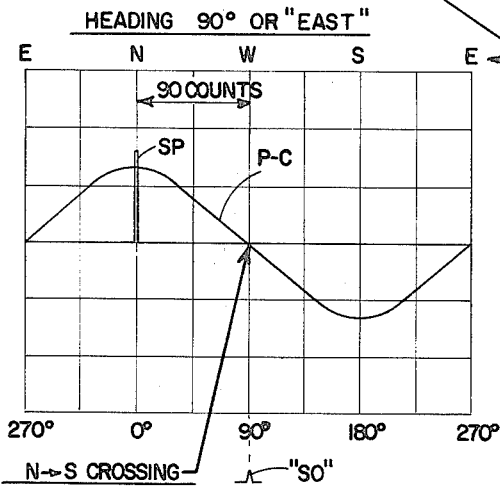
FIGS. 5-A through 5-D comprising four exemplary oscillograms depicting output signals of the type to be expected with the foregoing embodiments during approximately one scanning revolution.
Figure 5B:
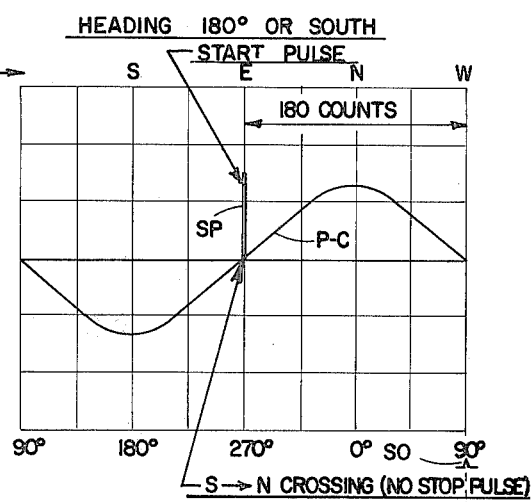
Figure 5C:
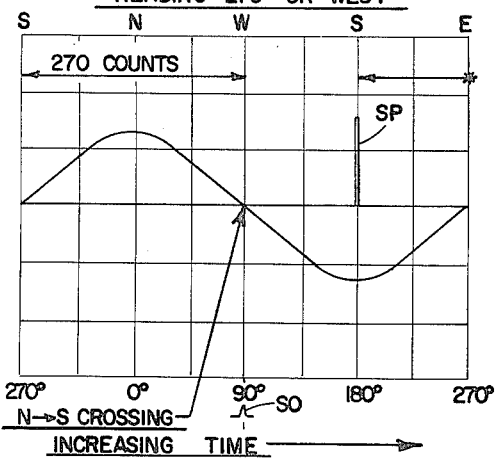
Figure 5D:
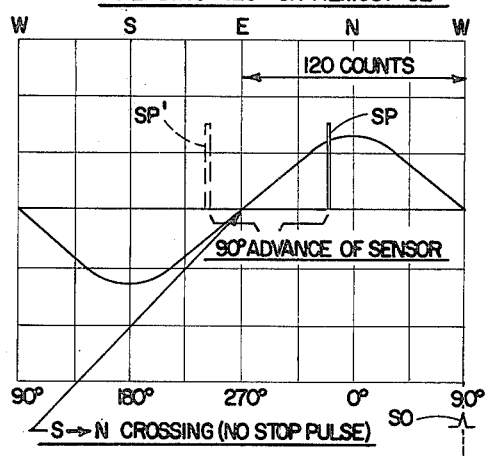

FIGS. 5-A through 5-D comprise four illustrative oscillograms of the geomagnetic flux output signal P-C (described above) shown in phase relation, to an illustrative START pulse $sp$ (reflecting vehicle heading along axis B), and the zero-crossing, or STOP pulse $so$ illustrative, respectively, of a carrier heading of 90°, 180°, 270° and 120° (the latter representing the illustrative situation of FIGS. 3, 4). By way of example, and assuming that the timing disc 13 has 360 equi-spaced slits SL (or one slit per degree), FIG. 5-A will be understood as indicating detection of the START slit (signal $sp$) at an EAST vehicle heading (adjusted by +90° counter-clockwise, to allow for zero-cross detection of MAG. WEST when NORTH is passed) to initiate a counting sequence in counter stage 35 and proceed counting pulses P-A (one each degree of rotation) to be stopped at the North/South zero crossing null; i.e., when carrier is headed MAG. WEST.

At this point, a STOP pulse $so$ emanates from stage 31 to terminate the operation of counter 35 at a total of ninety $sp$ pulses, thereby indicating a +90° variance between Carrier Heading and Magnetic North (which, in this case, means a detected Carrier Heading of Magnetic East, as mentioned above). To compensate for the 90° advance of the detection means (start at B' FIG. 3), with the zero crossing pulse being here shown at Magnetic West, the true relative position of START pulse $sp$ should be retarded 90° to Magnetic East indicating that the true carrier heading is 90° ahead of Magnetic North (assuming counter-clockwise concentrator rotation — similarly, North axis C is understood as rotated 90° to correspond with West axis C'). The other examples are to be similarly interpreted.

OPERATION

The operation of the foregoing embodiment (instrument 1 as in FIG. 1, plus associated illustrative detection and data processing electronics and display as in FIG. 2) will now be described by way of example, with reference to the schematic diagram in FIG. 3 and the pulse diagram example in FIG. 4.

In the illustrative situation of FIG. 3 above, it will be remembered that the vehicle heading is aligned along the reference axis (B) so that the detector unit 11 (photocells 11-cs, 11-cc thereof) is accordingly aligned along axis B as well (see indicated light beam position L-CS). It will be further understood that, for convenience of detection, a STOP pulse $so$ will be detected as a North/South zero-crossing — and thus advanced 90° in phase past the true geoflux heading (MAG NORTH or 0°). The oscillogram of FIG. 5-D represents the example of FIG. 3 and, accordingly, shows a START pulse $sp$ at about 330° on this compass (corresponding to a 240° heading in this compass, or 120° clockwise from NORTH; once the 90° correction for North/South zero-crossing detection is subtracted!). Similarly, a STOP pulse $so$ is shown at 90° (WEST) whereas, it may be taken to represent 0° (NORTH). This 90° correction for true magnetic heading may also be accommodated by simply rotating the rotatable concentrator 7 by 90° counter-clockwise so as to be aligned along axis B' for START and along WEST for STOP. (This 90° advancement is reflected in FIGS. 5-A through 5-D.)

Thus, comparing FIG. 3 and FIG. 5-D, it will be assumed that monitoring begins (pulses in FIG. 4) just beyond the due-South (180°) heading, proceeding in the counter-clockwise direction in FIG. 3 so that when the Start slit SL-S is registered over detection site L-CS (along radial axis B, aligned along the vehicle heading), the associated START photocell 11-cs will receive the reference illumination through SL-S to generate a Start pulse $sp$, applying this to multivibrator 33 (FIG. 2) to in turn apply an enabling signal to counter stage 35. Counter 35 will continue to be incremented, once for each degree pulse P-A proceeding from associated Degree-count photocell 11-cc (one pulse being generated therefrom with the passage of each degree slit SL past reference axis B). Now, concentrator 7 and timing disc 13 will rotate through arc AA to NORTH (or 120°) to bring them to the reference axis C at the 0° heading, whereupon counter 35 will be stopped at a 120° count. As workers in the art will realize, this 120° count may be readily employed to provide the desired digital carrier heading output (modifying it easily with any correction factors, automatically). This digital output P-E is presented to a utilization device 37 in the form of a digital direction indication (being appropriately displayed, etc. as mentioned and well understood in the art, though not illustrated here).

Processing of the chain of degree pulses may be better understood by reference to FIG. 4 where the degree pulses are indicated along the lower axis, where the Start pulses $sp$ are indicated along a second, upper axis synchronously, and the Stop pulses $so$ are similarly indicated along a third top axis. Referring also to reference radii B and C in FIG. 3 in the appropriate synchronous position for this example, it will be apparent that the counter output P-E will represent a 120° deviation (12 10° pulses shown), i.e., the degree slits SL and associated pulses detected between the onset of Start pulse $sp$ and Stop pulse $so$.

Of course, those skilled in the art will understand that other analogous means may be used to effect this mode of digital magnetic direction sensing, with detection of geoflux via a rotating flux concentrator and associated, synchronously rotated timing indicator, together with associated detection electronics and digital output. For instance, where the subject timer is optical (timing disc with transparent slits and associated photo-detection means), it will be apparent that, in certain instances, other equivalents such means may be equally well employed such as magnetic timer (e.g. magnetized markings and associated magnetic detection means, where any stray flux therefrom will not substantially interfere with or affect geoflux detection) or a mechanical timer (e.g. a mechanical timing detent and associated counting means) or the like.

Workers in the art will contemplate a variety of such means within the spirit and scope of the subject claims assembled to comprise a system for establishing the direction of a fixed (or slowly-varying) magnetic field, especially for determining a carrier heading with respect to the earth's magnetic field, especially using a rotating magnetic concentrator to direct this flux through a magnetic sensing device which generates an electrical signal proportional in magnitude and polarity to the geoflux presented to it, the signal being so processed as to stimulate a prescribed reference Stop signal at a particular phase in this rotational, cyclical detect cycle — especially where this phase comprises the North/South zero crossing appropriately detected and processed.

Such systems will be understood as operated in conjunction with timing signal means, such as the described coded timing disc synchronously rotated with the concentrator and adapted to generate both a Start pulse referenced to carrier heading while also generating prescribed degree pulses representing the angular deviation of carrier heading from geoflux heading — in digital form; it being further understood that, preferably, appropriate electronic processing means is provided to register and count these degree pulses, responsive to initiation by the Start signal and as terminated by the Stop signal, doing so digitally, with the digital count achieved thereby displayed, or otherwise processed, to represent this heading deviation in digital form. This combination will be understood and especially useful when implemented by stationary, omnidirectional flux concentrator, together with a rotating flux concentrator and a Hall Effect crystal (or like flux sensing device) interposed between these and adapted to electrically indicate the flux concentration passing therethrough.

As workers in the art will readily understand, associated supplemental means can readily be provided with a system like the foregoing, although details thereof will not be dwelt upon here. For instance, conventional geoflux compensating means may be provided, on or about the housing of the instrument, or elsewhere to compensate for local magnetic flux anomalies. As an example, means may be provided to correct for secular changes in the geomagnetic field, as well as for local anomalies (e.g. deriving from subterranean iron deposits, from local power lines or from magnetic storms).

Similarly, for the applicable local magnetic variation (angle of horizontal declination, or dip, as well known in the art); likewise a correction for the well known longitudinal deviation — e.g. a correction of about 6° west is necessary in Washington, D.C. — and other corrections, such as to convert from magnetic to true geographic heading. It will be apparent that the subject arrangement will readily permit presetting the counter 35 with any deviation factor, from 0° to 360° — e.g. doing so automatically, each cycle, after the counter has been reset to begin the following counting sequence (by means not shown, but well understood in the art).

Of course, the vertical dip of the earth's magnetic field will also vary from point to point on the earth's surface; however, it will be understood here to be a constant as usually assumed by workers in the art (a constant horizontal flux density component of about 0.2 Gauss is relatively conventional).

Also, conventional means may readily be provided with such a system whereby to hold a particular magnetic heading display — such as using the aforementioned memory means and associated memory cycling and switching means. This will allow one to maintain, and/or to recall, a digital heading display, despite changes in actual heading — e.g. where data must be recorded or computations made.

Also, workers will appreciate that the described start and stop functions may be reversed so that start is indicated upon detection of North (or any reference magnetic heading) and stop is indicated upon detection of the vehicle axis, etc. Also, the magnetic heading may be detected as a South/North crossing rather than the reverse, or as another convenient parameter. Further, a scanning rotation may be undertaken which is reversed from that indicated for the embodiment (that is, scanning clockwise, not counter-clockwise), with certain compensatory adjustments, of course. For instance, referring to FIG. 3, with such a clockwise mode of rotation, it would be more convenient to use the C axis (magnetic North) as the starting point (rather than the stopping point), and rotate and count degree pulses until stopped by detection of vehicle axis B. Thus, mark L-cs will become the stop mark rather than the start mark. Also, if the C' axis (magnetic West) is to be used to effectively detect magnetic North, then, with rotation so reversed, the start command pulse will have to be initiated by detection of a South/North crossing, not a North/South crossing as before, with appropriate adjustments in the detection circuitry as understood by those skilled in the art.

Similarly, although a digital output has been emphasized in the embodiment, and obviously lends itself to embodiments like these, it will be apparent to those skilled in the art that this may readily be modified to provide an analog output. For instance, especially as used in a boat, at least one of the outputs would take the form of a 360° compass meter, typically provided as a display. Here, the described embodiment would be supplemented with a digital-analog converter and analog read-out instead of, or in addition to, the digital read-out described above. In other applications, such as in aircraft (e.g. with an autopilot system), it will be preferable to provide both digital and analog read-out.

Those skilled in the art will recognize that the foregoing embodiments are intended primarily to illustrate how the invention is made and used and not to be taken as limiting. The invention is susceptible of modification and variation in a variety of ways without departing from the spirit and scope of the appended claims. For example, changes may be made in the timing means (e.g. relation between degrees and pulses) or in the signal processing system (e.g. reversing the functions of the Start and Stop signals indicated, preferably with the rotational direction reversed as well).

Therefore, the invention will be understood as limited only within the scope of the appended claims.

What is claimed is:

1. An improved magnetic compass system for generating a digital signal indicative of the heading of a vehicle comprising:

a housing mounted on said vehicle;

magnetic flux sensor means fixedly and non-rotatably mounted on said housing;

flux concentrator means mounted in proximity to said sensor means so as to provide lines of magnetic flux therethrough, said flux concentrator means comprising at least one element rotatably mounted on said housing;

drive means for rotatably driving said rotatably mounted element thereby to vary the flux through said sensor means;

means connected to said drive means for generating a marker signal indicative of a predetermined position of said drive means relative to the heading of said vehicle and means responsive to the marker signal and the output of said sensor means for generating a digital signal in accordance with the angular difference between said predetermined drive means position and the position of said drive means when the output of said sensor changes direction in a predetermined sense, said digital signal representing the compass heading of said vehicle.

2. The system of claim 1 wherein said flux concentrator means comprises a second element fixedly mounted on said housing, said flux sensor means being fixedly mounted on one end of said second element directly opposite one end of said rotatably mounted element.

3. The system of claim 2 wherein said flux sensor means comprises a Hall effect crystal.

4. The system of claim 2 wherein said flux concentrator elements are of a magnetically soft ferromagnetic material, the cross sectional area of said elements tapering towards the oppositely positioned ends thereof.

5. The system of claim 4 wherein the rotatably mounted element is horn shaped with the flared end of said horn being bent substantially normally to the end thereof positioned opposite said one end of the rotatably mounted element.

6. The system of claim 5 wherein the flared end of said rotatably mounted element faces in a direction substantially normal to the axis about which said rotatably mounted element is driven and a non-magnetic counterweight attached to said rotatably mounted element for providing a counterbalance therefor.

7. The system of claim 1 wherein said means for generating a marker signal comprises an essentially opaque timing disc having transparent equally spaced slits extending therearound, said disc being rotatably driven by said drive means, a light source fixedly mounted on said housing on one side of said disc and a photosensitive detector fixedly mounted on said housing on the opposite side of said disc, the output of said detector comprising the marker signal.

* * * * *